United States Patent
Fleming et al.

(10) Patent No.: US 6,945,041 B2
(45) Date of Patent: Sep. 20, 2005

(54) BENT AXIS HYDROSTATIC MODULE WITH MULTIPLE YOKES

(75) Inventors: John Fleming, Ankeny, IA (US); Scott Meyer, Ames, IA (US); Doug Kardell, Grimes, IA (US); Christopher P. Masini, Ames, IA (US); Jeffrey C. Marks, Waterloo, IA (US)

(73) Assignees: Sauer-Danfoss, Inc., Ames, IA (US); Deere & Company, Moline, IL (US)

(*) Notice: Subject to any disclaimer, the term of this patent is extended or adjusted under 35 U.S.C. 154(b) by 0 days.

(21) Appl. No.: 10/740,022

(22) Filed: Dec. 18, 2003

(65) Prior Publication Data

US 2004/0261408 A1 Dec. 30, 2004

Related U.S. Application Data

(60) Provisional application No. 60/483,222, filed on Jun. 27, 2003.

(51) Int. Cl.$^7$ ............................................. F16D 31/02
(52) U.S. Cl. ............................................. 60/484; 60/486
(58) Field of Search .................... 92/56–58; 60/487–492

(56) References Cited

U.S. PATENT DOCUMENTS

| | | | |
|---|---|---|---|
| 2,962,915 A | * 12/1960 | Wiggermann | ................ 475/82 |
| 3,795,179 A | 3/1974 | Picker | |
| 4,825,722 A | 5/1989 | Hagin et al. | |
| 6,203,283 B1 | 3/2001 | Fleming et al. | |
| 6,257,119 B1 | 7/2001 | Ryken et al. | |
| 6,260,468 B1 | * 7/2001 | Ryken et al. | ................ 91/506 |
| 6,530,855 B1 | 3/2003 | Folsom et al. | |

* cited by examiner

Primary Examiner—Edward K. Look
Assistant Examiner—Devin Hanan

(57) ABSTRACT

A bent axis hydrostatic module, comprising: a frame, a pair of parallel laterally spaced shafts rotatably supported by the frame and directed outwardly from the frame in the same direction. Two yokes are pivotally mounted about parallel axes on the frame. A hydrostatic power unit is swingably carried by each yoke, and each hydrostatic power unit being operatively connected to one of the shafts to rotate the same. A pair of system pressure conduits in the frame with each of the pressure conduits are fluidly connected to each of the cylinder blocks. A control system is provided for pivoting the yokes including means for independently pivoting the yokes about parallel axes.

4 Claims, 8 Drawing Sheets

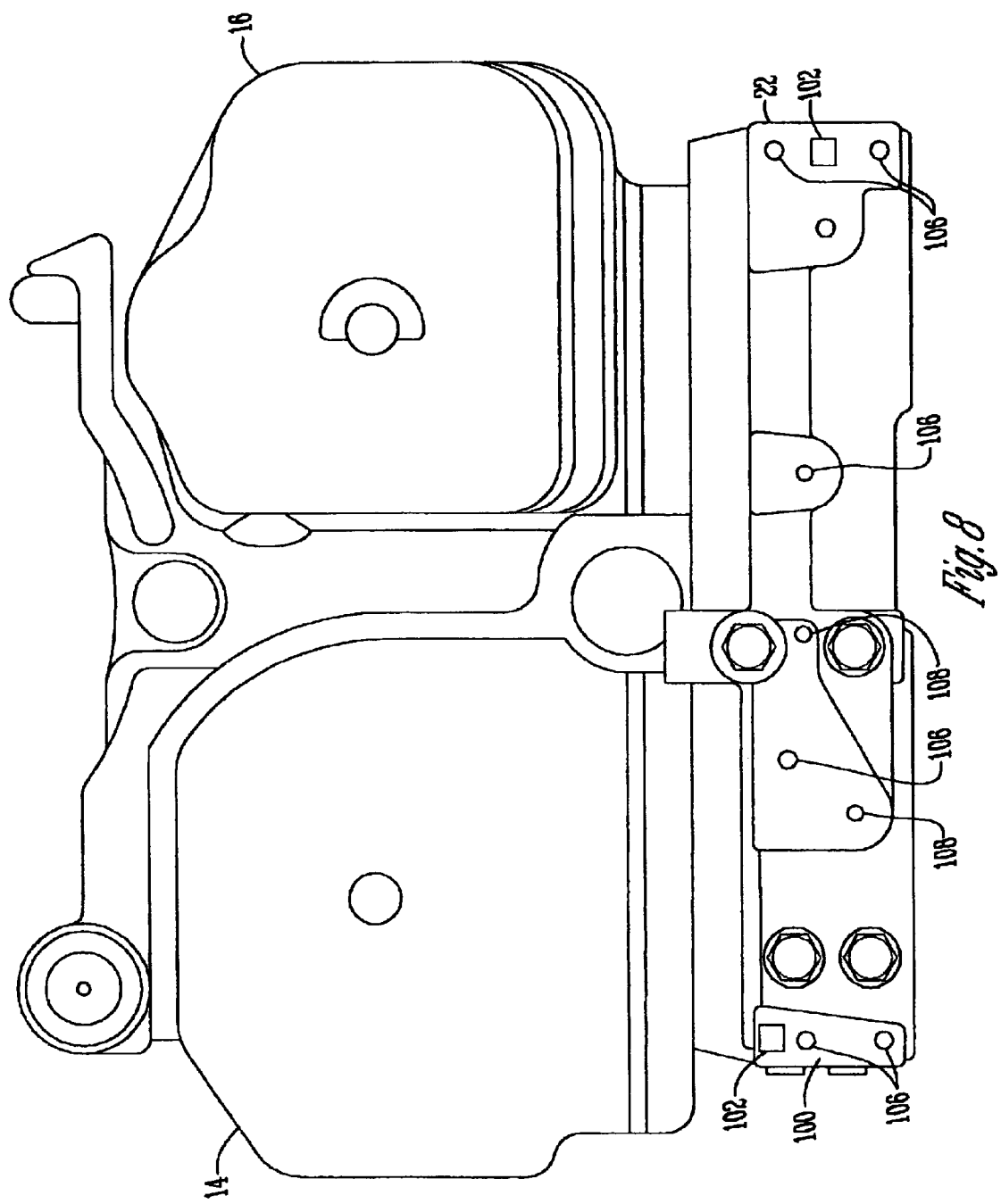

BENT AXIS HYDROSTATIC MODULE WITH MULTIPLE YOKES

CROSS REFERENCE TO A RELATED APPLICATION

This application claims the benefit of Applicants' Provisional Application Ser. No. 60/483,222 filed Jun. 27, 2003.

BACKGROUND OF THE INVENTION

The present invention relates to the field of variable displacement bent axis hydraulic units. Bent axis hydraulic units have been known for many years.

Such devices obviously have power output limited to their physical size. When additional power is required, a solution is to provide a unit of larger size. However, space and size become a problem in certain vehicle designs and serve to prevent larger bent axis hydraulic units from accommodating this situation when more power and limited space are specified.

Prior art shows attempts to use hydromodules that have multiple yokes; however, these inventions fallen short when attempting to provide a hydromodule with bent axis hydrostatic units that have a simplified construction with as few parts as necessary, as well as a compact construction with the yokes taking up as little space as possible. For example, the U.S. Pat. No. 6,530,855 patent to Folsom discloses bent axis hydrostatic modules that have multiple yokes. When referring to WO99/24738 as referred to by Folsom, one can see Folsom relies on a stationary manifold block to accommodate its fluid passages between the pump and the motor, with the porting of hydrostatic flow through the piston slippers to the cylinder block. Thus, the Folsom patent shows a sizeable construction with a large number of separate parts which potentially results in a higher unit manufacturing cost as well as potential decreases in the unit's reliability.

It is therefore a principal object of this invention to provide a bent axis hydrostatic unit with a pair of bent axis hydrostatic power units working in unison in side by side relation to provide a greater power output, and which includes parallel, unidirectional rotatable power shafts; dual swingable yokes pivotally mounted on a frame, and means for independently pivoting the yokes about parallel axes.

It is a further object of the invention to provide a bent axis hydrostatic module with multiple yokes wherein the yokes are of single piece construction.

It is another object of the invention to provide a bent axis hydrostatic module with multiple yokes wherein the yokes contain integrated fluid passages.

These and other objects, features, or advantages of the present invention will become apparent from the specification and claims.

BRIEF SUMMARY OF THE INVENTION

A hydrostatic module is disclosed, including a pair of parallel laterally spaced shafts rotatably supported by a frame, and directed outwardly from the frame in the same direction. Two single piece yokes containing integrated fluid passages are pivotally mounted about parallel axes on the frame. A hydrostatic power unit is swingably carried by each yoke, and each hydrostatic power unit is operatively connected to one of the shafts to rotate the same. A pair of system pressure conduits are located in the frame, with each of the pressure conduits being fluidly connected to each of the cylinder blocks. A control system independently pivots the yokes about parallel axes.

BRIEF DESCRIPTION OF THE DRAWINGS

FIG. 8 is a front perspective view the hydrostatic module of the present invention showing a joint surface of the manifold.

DETAILED DESCRIPTION OF THE PREFERRED EMBODIMENT

Figure 1:
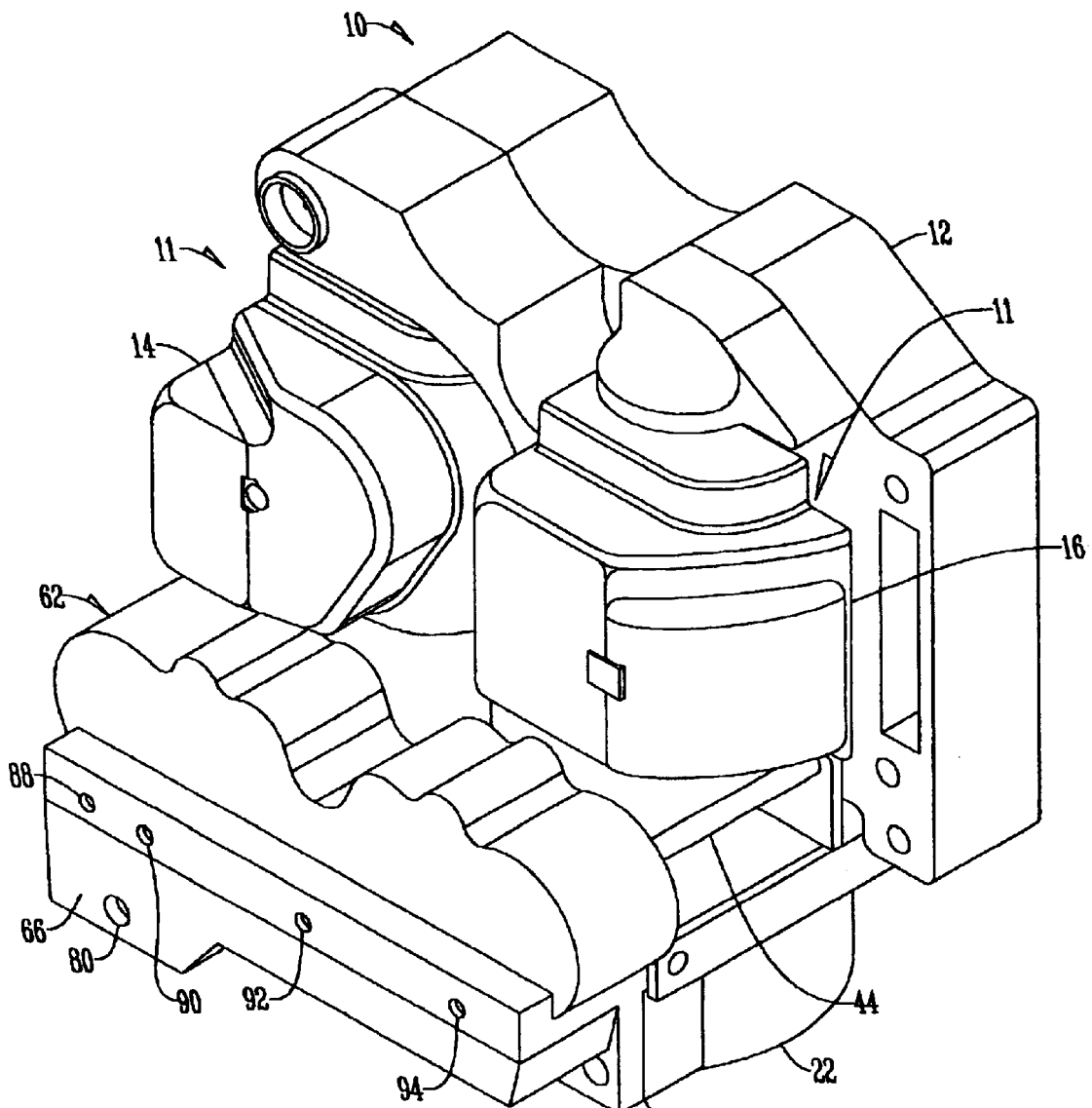
FIG. 1 is a front perspective view of an embodiment of the hydrostatic module of the present invention.

Referring to FIG. 1, the hydrostatic module 10 of the present invention includes bent axis hydrostatic units 11 and a frame 12. The frame 12 acts as a structural unit to hold and locate other components, and also reacts against forces within module to hold components in place.

Figure 4:
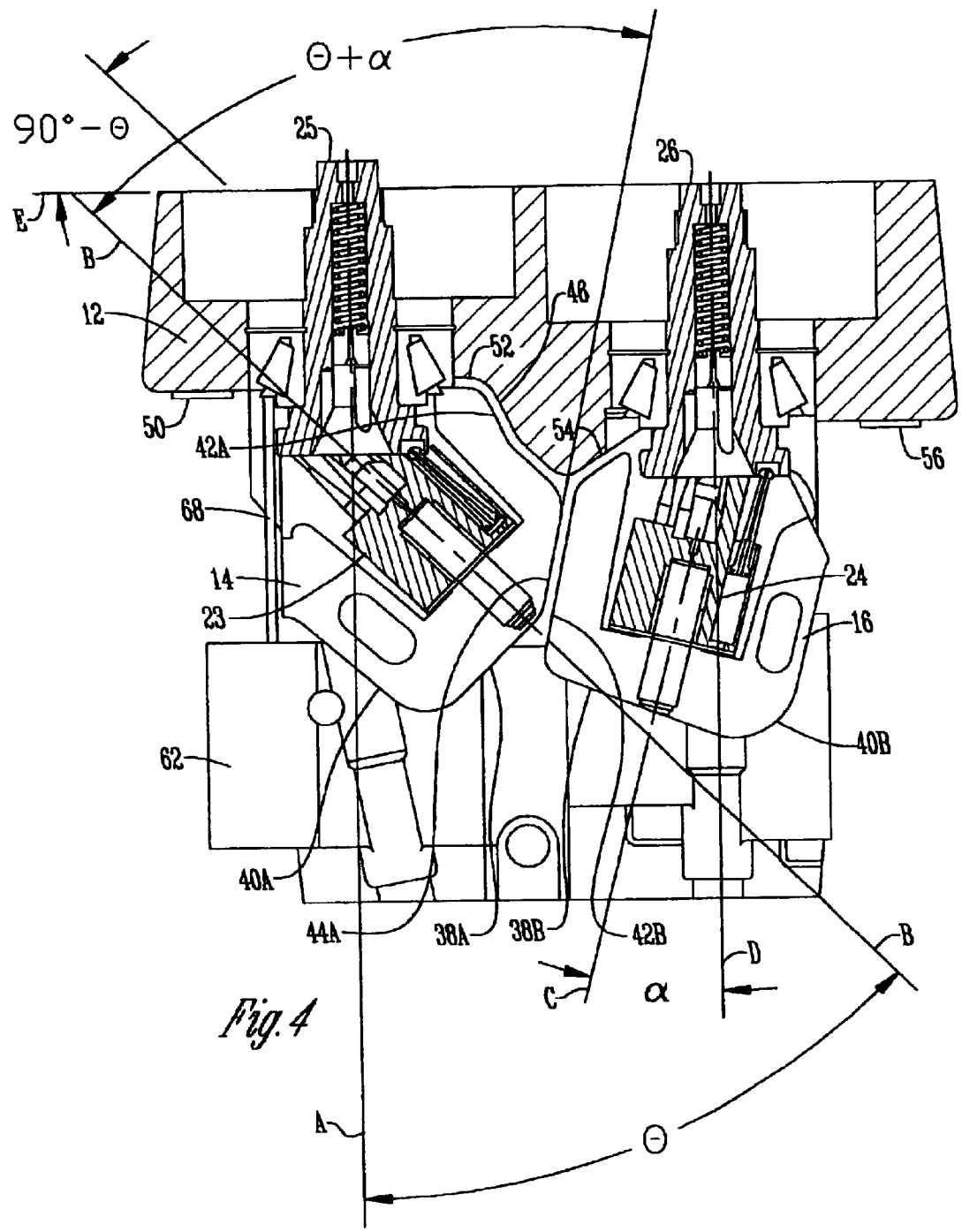
FIG. 4 is a cross sectional top view of the hydrostatic module of this invention.

Referring to FIG. 4, a clutch unit yoke 14 and ring unit yoke 16 contain and carry hydrostatic power units (cylinder blocks or kits) 23 and 24, respectively, and are pivotally mounted on the frame 12 to pivot with respect to the frame 12 in intersecting paths. The two yokes 14 and 16 are captured between the frame 12 and a manifold 22, when assembled.

The hydrostatic power units 23 and 24 are operatively connected to a pair of parallel laterally spaced shafts 25 and 26, respectively. The shafts 25 and 26 are rotatably supported by the frame 12 and directed outwardly from the frame 12 in the same direction. The hydrostatic power units 23 and 24 operate to rotate the shafts 25 and 26.

The two hydrostatic power units 23 and 24 are then contained within, and loaded against, the yokes 14 and 16 and the frame 12. The frame 12 positions the shafts 25 and 26 in turn aligns gears 27 assembled to the shafts 25 and 26 within the planetary ring gear and clutch gear of a vehicle transmission (not shown) respectively. Thus, the two hydrostatic power units 23 and 24 and the associated yokes 14 and 16 are referred to as the clutch unit yoke 14 and ringed unit yoke 16.

Figure 6:
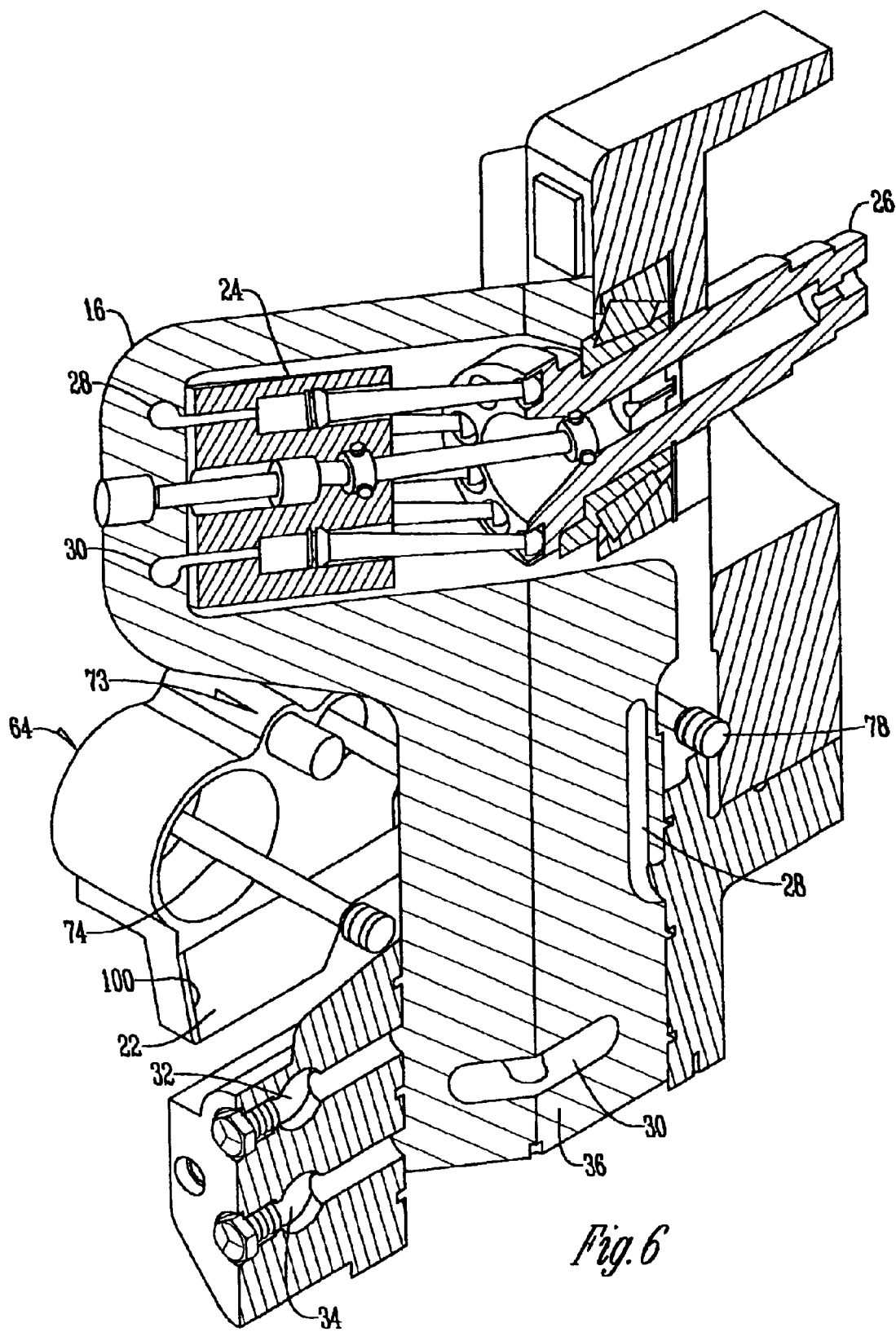
FIG. 6 is a partial a cross sectional side view of the hydrostatic module of this invention.

Referring to FIG. 6, the yokes 14 and 16 are preferably of single piece construction. These single piece yokes 14 and 16 contain integrated fluid passages 28 and 30. Details of single piece yokes 14 and 16 containing integrated fluid passages 28 and 30 are disclosed in U.S. Pat. No. 6,203,283, which is hereby specifically incorporated herein by reference in its entirety.

The manifold 22 functions as the conduit for high pressure fluid between all hydrostatic power units 23 and 24 in the assembly and also contains the necessary valving for the hydromodule 10. The manifold 22 has auxiliary valving (not shown) for pressure protection and loop flushing. The manifold 22 also has two internal cored passages 32 and 34 extending from yoke 14 to yoke 16 to form two working loops of the hydromodule 10, These internal cored passages 32 and 34 act as a conduit to channel oil from one yoke to the other.

The passages 32 and 34 in manifold 22 port fluid through the integrated fluid passages 28 and 30 of yoke 16. The passages 32 and 34 communicate with integrated fluid passages 28 and 30 along the trunnion 36 of the yoke 16. The fluid is transported through one of the integrated fluid passages 28 and 30 in yoke 16 from the trunnion 36 to an end wall 38B. In the end wall 38B the fluid is pulled from one of the integrated fluid passages 28 and 30 into one side of the hydrostatic power unit 24. The other side of the hydrostatic power unit 24 forces fluid back into the other of the integrated fluid passages 28 and 30 at the end wall 38B, and from there back to trunnion 36 and the corresponding integrated fluid passage 28 or 30. Likewise, yoke 14 includes a similar integrated fluid passage structure.

As shown in FIG. 4, each yoke 14 and 16 has outer surface 40A and 40B including end wall 38A and 38B and a side wall 42A and 42B, respectively. The outer surfaces 40A and 40B of yokes 14 and 16 have complimentary surfaces to one another as well as to the frame 12 to minimize the magnitude of the space occupied by the yokes 14 and 16 when the complimentary surfaces of outer surfaces 40A and 40B are in closely spaced relation.

Specifically, the end wall 38A of yoke 14 includes a contoured portion 44A on the yoke 14 outer surface 40A. This contoured portion 44A permits the end wall 38A of yoke 14 to be nested or positioned in closely spaced relation to the side wall 38B of the yoke 16 without the two yokes 14 and 16 contacting one another. Likewise a contour rib 46 on the frame 12 is contoured to mate with the yoke 14 side wall 42A.

The contour angle on these portions 44A and 46 is a function of the pivot angle of the yokes 14 and 16. The yoke 14 pivots counter clockwise through an angle theta (θ) and the yoke 16 pivots clockwise through an angle alpha (α). (FIG. 4). Specifically, the yoke 14 has a yoke centerline B that pivots counter clockwise through an angle θ relative to a shaft 25 centerline A. Yoke 16 has a yoke centerline C that pivots clockwise through an angle α relative to a shaft 26 centerline D of that yoke. Consequently the angle of the contour portion 44A on the end wall 38A of the yoke 14 is equal to θ plus α relative to the centerline B of the yoke 14. Likewise, the angle of the contour rib 46 on the frame 12 mating with the side wall 42A of the yoke 14 is equal to 90 degrees minus θ, relative to a surface E of the frame 12 perpendicular to the shaft 25 centerline A.

The provision of portions 44A and 46 allows the width dimension of the hydrostatic module 10 to be minimized, where the width dimension of the hydrostatic module 10 is a critical design criteria. Specifically, the hydromodule 10 of this invention is intended to fit within the housing envelope of modern tractors which are compact and need to avoid interference with the line of sight visibility of the operator who must clearly see the ground surface immediately in front of the cab. Further, the position of the yokes 14 and 16 must meet the requirements of gearing center lines, including alignment of shafts 25 and 26 with gear center lines while allowing the yokes 14 and 16 to be positioned closer together without interference with each other. Additionally, each yoke 14 and 16 must be able to be placed at multiple angular positions regardless of the position of the other yoke. Thus, minimizing the width dimension of the hydrostatic module 10 is a critical design criteria which the portions 44A and 46 permit.

Figure 5:
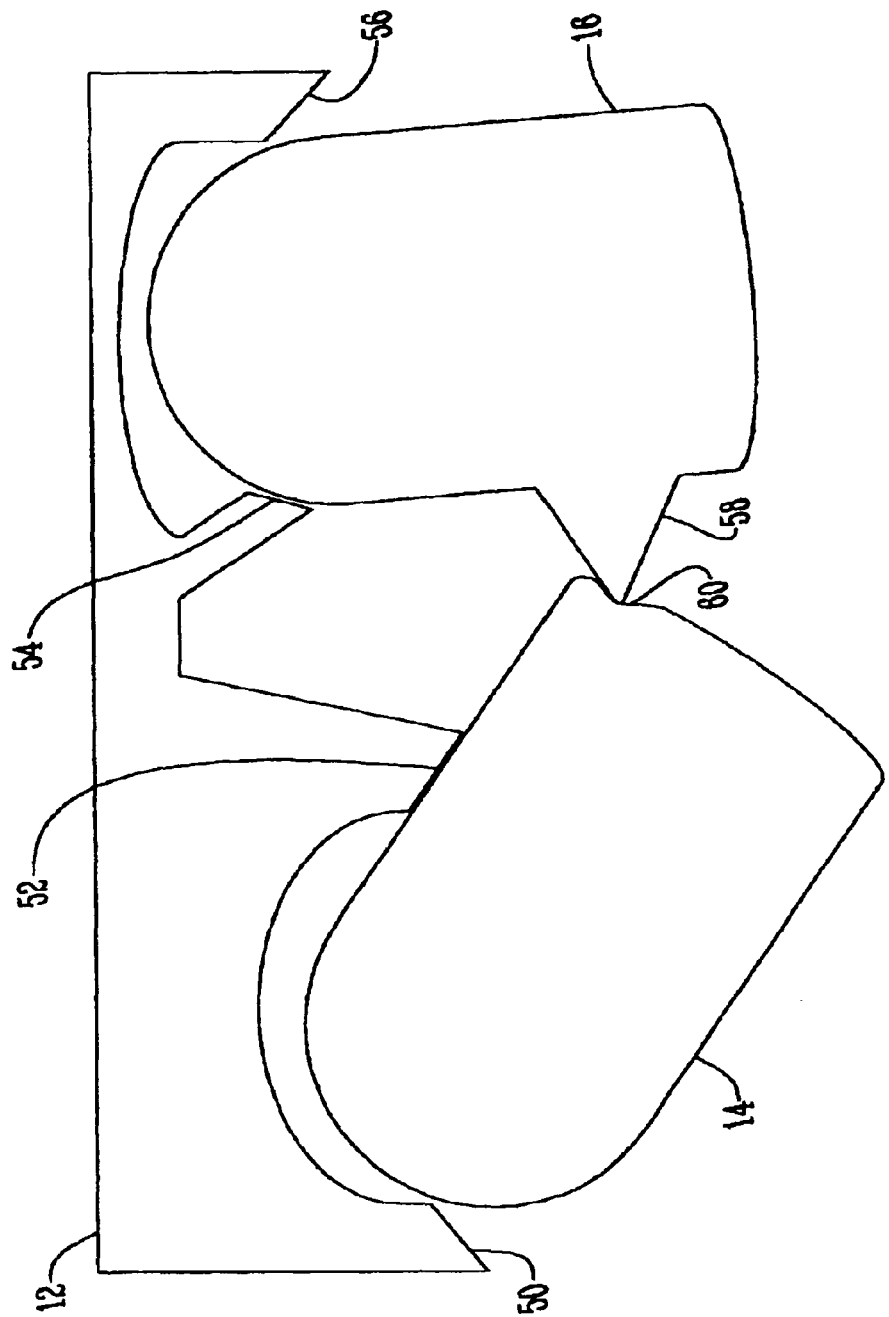
FIG. 5 is a schematic top view of the yokes and stops of the present invention.

As shown in FIG. 5, the hydromodule 10 is provided with more than 2 hard stops. Typically with a variable angle yoke, there are two mechanical hard stops that limit the travel of the yoke. In the present invention, the provision of more than 2 hard stops allows the yokes 14 and 16 to be accurately positioned at an angle between the two mechanical hard stops.

Specifically, the hydromodule 10 incorporates four stops 50, 52, 54, and 56 into frame 12 to stop the yokes 14 and 16, which swing in close proximity to each other, from coming into contact. The hydromodule 10 has a clutch unit yoke 14 max outboard angle stop 50 and inboard angle stop 52. The ring unit yoke 16 has a yoke max inboard angle stop 54 and outboard angle stop 56. The stops 50, 52, 54, and 56 may be of any suitable angle. The yokes 14 and 16 define a neutral position for the cylinder blocks 23 and 24 and the shafts 25 and 26 when in predetermined positions of pivotal movement (shaft 25 centerline A and shaft 26 centerline D). The stops 50, 52, 54, and 56 permit the yokes 14 and 16 to be pivoted within the following parameters with "plus" meaning a clockwise direction from a neutral position, and "minus" meaning a counterclockwise direction from a neutral position. As shown, the clutch unit yoke 14 swings through an arc of a minimum angle of −45° at stop 50 to a maximum of +45° at stop 52. The ring unit yoke 16 swings through an arc minimum angle of −15° at stop 54 to a maximum angle of +45° at stop 56. Thus stops 50, 52, 54, and 56 permit the yokes 14 and 16 to be pivoted to the following combination of positions: one yoke minus 45° and one yoke minus 15°; one yoke plus 45° and one yoke minus 15°; one yoke plus 45° and one yoke minus 15°; one yoke plus 45° and one yoke plus 45°; one yoke minus 45° and one yoke minus 45°; and one yoke 45° and one yoke at 15°.

An integral stop 58 on yoke 16 and a corresponding integral groove 60 on yoke 14 are physical features incorporated into the two hydrostatic yokes 14 and 16. As the hydrostatic yokes 14 and 16 swing through a range angles in close proximity to each other, the integral stop 58 on yoke 16 provides additional angles where the yokes 14 and 16 can be stopped at a known position. The integral stop 58 on yoke 16 and the corresponding integral groove 60 on yoke 14 are placed on the yokes 14 and 16 such that they come into contact at the desired combination of angles.

The additional combinations yoke angles set by the integral stop 58 and integral groove 60 are needed to more accurately set the hydrostatic ratio of the hydromodule 10. The yokes 14 and 16 are hydraulically positioned with a position sensing servo control system 62 (shown in FIGS. 1 and 3). The integral stop 58 and integral groove 60 are needed at special combinations of yoke angles because the servo control system 62 does not offer the accuracy and repeatability that an integral stop 58 provides. This combination of angles can be at any desired angle other than the minimum and maximum stop limits. As shown, integral stop 58 on yoke 16 and the corresponding integral groove 60 on yoke 14 were added to the yokes 14 and 16 to create physical interference between the yokes 14 and 16 at a specific combinations of yoke angles where the left yoke 14 is commanded to a physical hard stop at +44.5° and the right yoke 16 is commanded to a physical hard stop at +13.5°.

Figure 3:
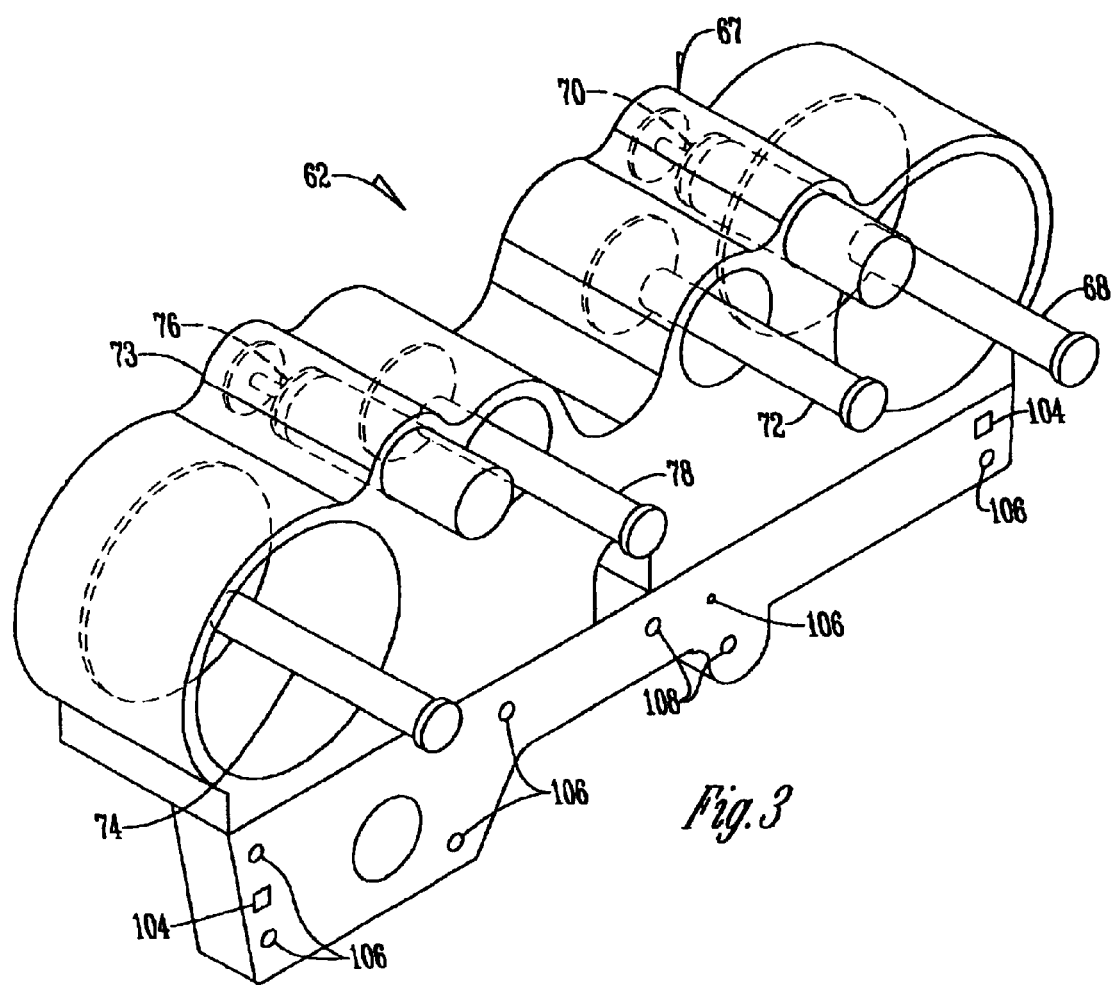
FIG. 3 is a perspective view of the control housing of the present invention.

As shown in FIGS. 1 and 3, the servo control system 62 of hydromodule 10 includes a single piece control housing 64. The control housing 64 contains the hardware required to control the positions of the yokes 14 and 16, and thus the displacement of the hydrostatic power units 23 and 24—as commanded by an operator.

Specifically, the single piece control housing 64 is specially equipped with a first servo control 67 including a first servo valve 70 that is associated with a first servo piston 68 and a first bias piston 72. The housing 64 likewise has a second servo control 73 including a second servo valve 76 that is associated with a second servo piston 74 and second bias piston 78. The servo valves 70 and 76 control the hydraulic pressure on servo pistons 68 and 74 as well as bias pistons 72 and 78. The hydraulic pressure on pistons 68, 74, 72, and 78 causes the pistons 68, 74, 72, and 78 to slide in and out of the single piece control housing 64. As best seen in FIG. 6, the second servo control 73 position the yoke 16 by the pistons 74 and 78 rotating the trunnion 36 as the pistons 74 and 78 slide in and out of the single piece control housing 64. Likewise, first servo control 67 pistons 68 and 72 act in a similar manner to position the yoke 14. Thus, the multiple servo controls 67 and 73 independently establish the position of the hydrostatic yokes 14 and 16 and the rotational power supplied to the shafts 25 and 26 over an operating range of +/−45°.

Figure 7:
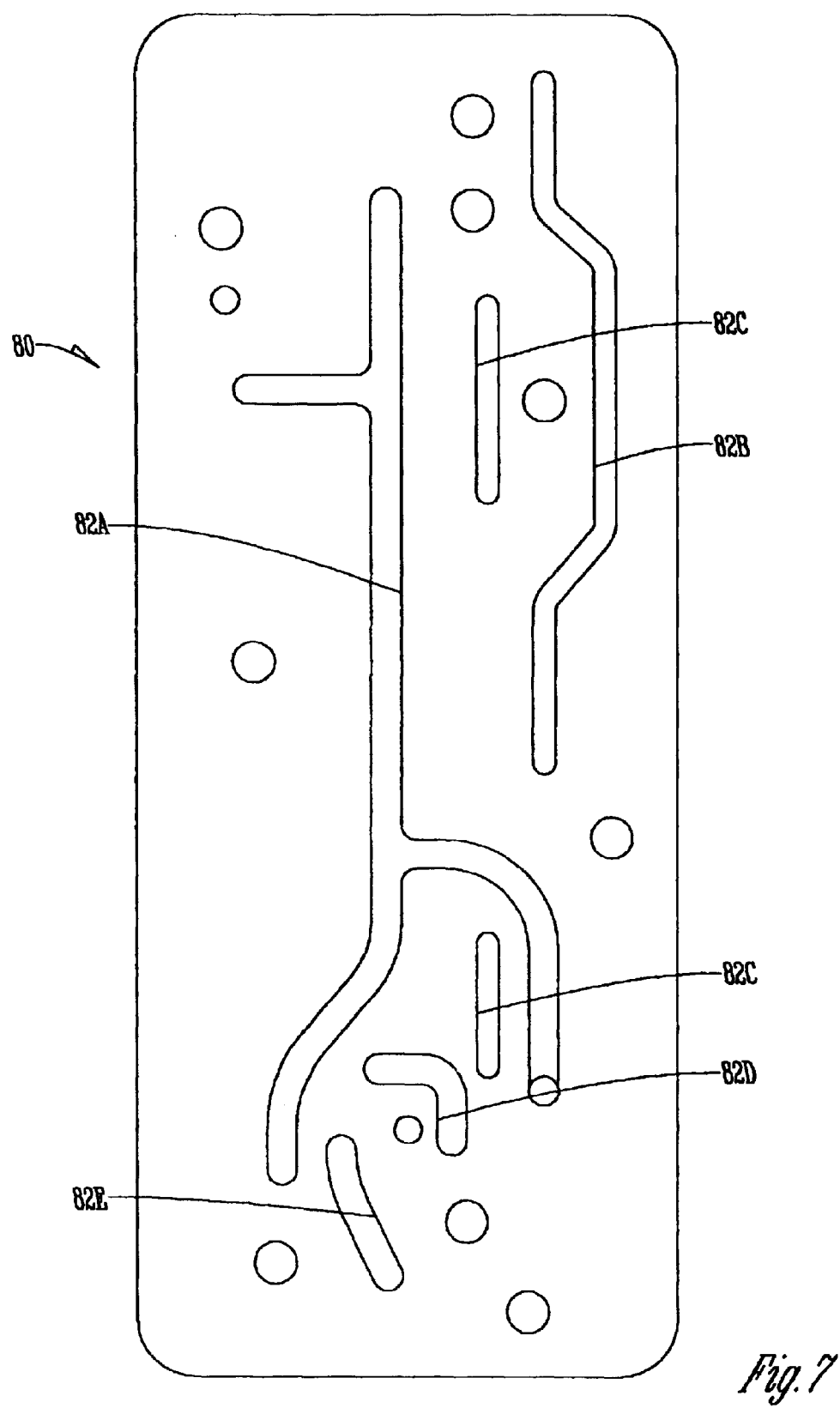
FIG. 7 is a top view of the porting plate of the present invention.

As shown in FIGS. 1, 3 and 7, the servo control system 62 of hydromodule 10 includes a control porting plate 66 attached to the single piece control housing 64. The control system 62 routes oil to the multiple servo controls 67 and 73 and makes a plurality of hydraulic connections between a transmission (not shown) and the hydromodule 10 inside the transmission. One of the plurality of hydraulic connections between a transmission (not shown) and the hydromodule 10 is placed in the control porting plate 66. The remaining hydraulic connections between a transmission (not shown) and the hydromodule 10 are placed in the single piece control housing 64.

Specifically, the control porting plate 66 has a single control supply pressure inlet 80. The single control supply pressure inlet 80 is hydraulically connected to a transmission (not shown) to receive hydraulic fluid. The control porting plate 66 routes the hydraulic fluid from the single control supply pressure inlet 80 to multiple outlet groves 82A–E. These outlet grooves 82A–E are positioned to abut the single piece control housing 64. These outlet groves 82A–E hydraulically communicate with corresponding inlets (not shown) to the multiple servo controls 67 and 73, to supply hydraulic pressure to the various components of the multiple servo controls 67 and 73. Thus, the control porting plate 66 acts as a manifold to route the hydraulic fluid to multiple locations within the single piece control housing 64.

Additionally, as noted above, the single piece control housing 64 has a multiple hydraulic connections between a transmission (not shown) and the hydromodule 10. These multiple hydraulic connections include a hydromodule loop charge pressure supply 88, a first pressure command signal outlet 90, a second pressure command signal outlet 92, and a hydromodule loop cooling flow return 94. These multiple hydraulic connections 88, 90, 92, and 94 route the hydraulic fluid to multiple locations within the manifold 22 as well as the yokes 14 and 16.

Thus, the control housing 64 includes the integration of fluid passages, support structure, servo valves, and servo pistons into a single piece to control multiple hydrostatic yokes 14 and 16. The fluid passages, support structure, servo valves, and servo pistons are all packaged into the single housing 64 to fit into limited space provided inside an agricultural tractor transmission (not shown). The control housing 64 design is a variation of the SINGLE-PIECE PROPORTIONAL CONRTOL design disclosed in U.S. Pat. No. 6,260,468, the disclosure and drawings of which are hereby specifically incorporated herein by reference in its entirety.

Figure 2:
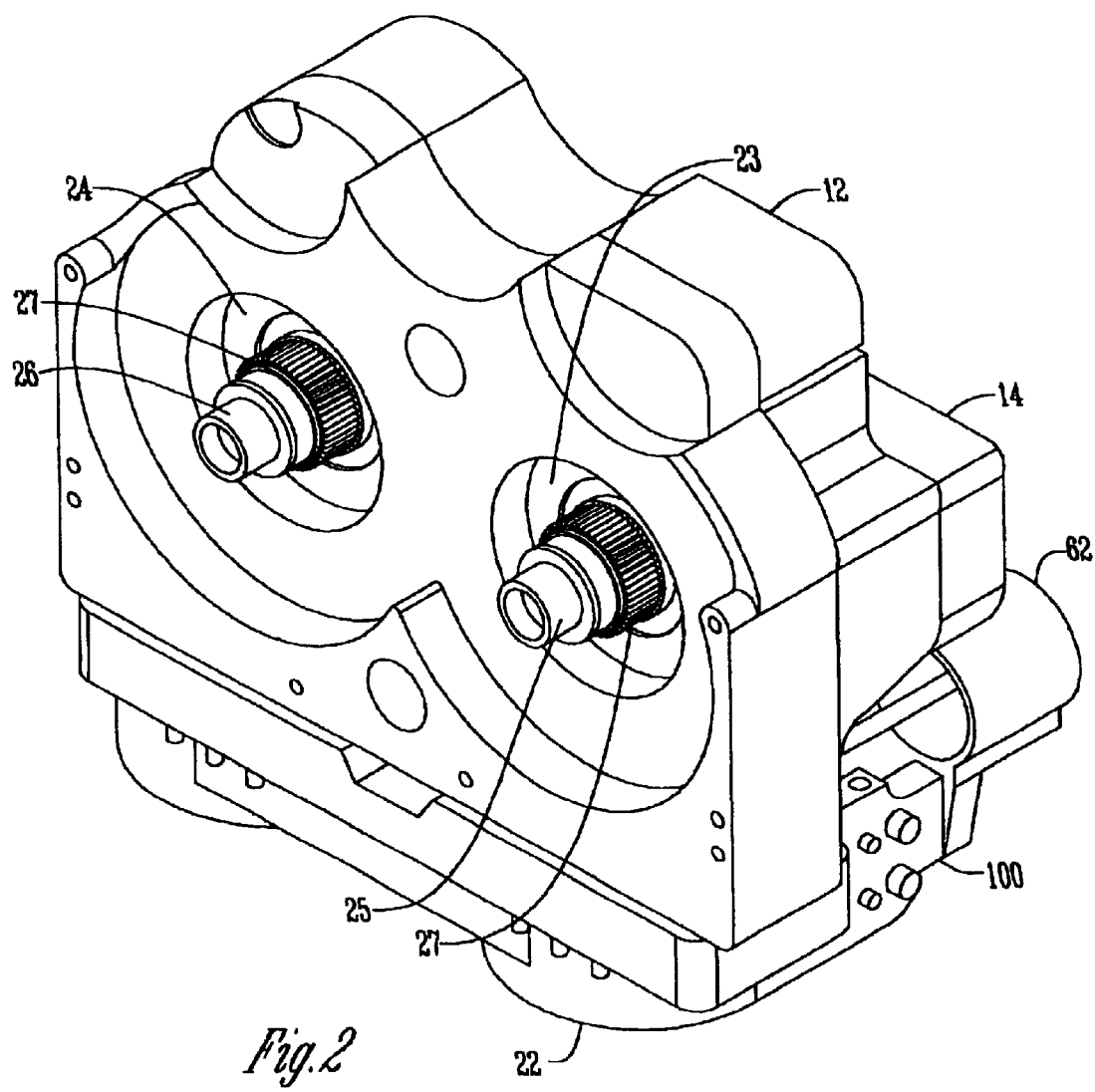
FIG. 2 is a back perspective view of the hydrostatic module of the present invention.

As shown in FIGS. 1 and 2, a joint surface 100 on the manifold 22 mates the manifold 22 to the control housing 64. As shown in FIGS. 3 and 8, mounting feature pegs 102 extend from joint surface 100. The mounting feature pegs 102 mate with corresponding mounting feature holes 104 in the control housing 64. The corresponding mounting feature pegs and holes 102 and 104 properly position the control housing 64 with respect to the manifold 22 during assembly. Likewise bolt holes 106 in joint surface 100 and the control housing 64 align with one another to permit the control housing to be removably affixed to the manifold 22.

Additionally, still referring to FIGS. 3 and 8, control housing ports 108 align with manifold ports 110 on the joint surface 100. The control housing ports 108 route fluid between the hydromodule loop charge pressure supply 88 and the hydromodule loop cooling flow return 94 to the manifold ports 110 on the joint surface 100. The manifold ports 110 operate as fluid valving to route fluid between internal cored passages 32 and 34 in the manifold 22 which act as a conduit to channel oil from one yoke to the other and port fluid through the integrated fluid passages 28 and 30 of yokes 14 and 16. Thus, the hydraulic system flow between vehicle and module 10 is routed to the manifold 22 through the control housing 64, improving the exchange of fluid at the control housing 64 and manifold joint 100. The close proximity of the control housing 64 to the manifold 22 allows for simplified exchange of hydraulic fluids required for the function of the module 10, allowing for a more compact design and thus benefiting packaging as well as cost.

Additionally, due to the joining of the control housing 64 to the manifold 22 at joint surface 100, the control housing 64 shares in the characteristics of the manifold 22. The manifold 22 is a main structural element of the module 10 and is designed to be located very exactly to all key hydromodule 10 components. The manifold 22 is stiff and rigid and maintains its position and space as large loads act upon it. The manifold 22 is also used as a structural support component for the leveraged stiffness required to react to the forces created in the control housing 64. The stiffness of the control housing 64/manifold 22 allows the use of mounting features 102 and 104 for manifold 22 to be added to the control housing 64. Thus, the forces acting on the control housing 64 are shared through the joint 100 by the rest of the hydromodule 10 structure.

Therefore, disclosed is a bent axis hydrostatic module 10 with multiple yokes 14 and 16 which are shaped and positioned to nest with each other so as to minimize the space requirement of the entire hydrostatic module 10. The invention also provides a bent axis hydrostatic module 10 with multiple yokes 14 and 16 wherein mechanical stops 58 and 60 are provided on the yokes 14 and 16 to control the pivoting angle of the yokes 14 and 16. In addition, the invention also provides a bent axis hydrostatic module 10 with multiple yokes 14 and 16 wherein a single piece control housing 64 is provided to control the movement of both yokes 14 and 16. Further, the invention also provides a hydrostatic module 10 with a stiff structural fluid manifold 22 assembly secured to the control housing 64. Finally, the invention also provides a hydrostatic module 10 with a single piece porting plate 66 to convey fluid to the needed locations within the control housing 64.

It will be appreciated by those skilled in the art that other various modifications could be made to the device without the parting from the spirit in scope of this invention. All such modifications and changes fall within the scope of the claims and are intended to be covered thereby.

What is claimed is:

1. A bent axis hydrostatic module, comprising:

a frame;

a pair of parallel laterally spaced shafts rotatably supported by the frame and directed outwardly from the frame in the same direction;

two yokes pivotally mounted about parallel axes on the frame;

a hydrostatic power unit swingably carried by each yoke, and each hydrostatic power unit being operatively connected to one of the shafts to rotate the same;

a pair of system pressure conduits in the frame with each of the pressure conduits being fluidly connected to each of the cylinder blocks; and a control system for pivoting the yokes including means for independently pivoting the yokes about parallel axes.

2. The hydrostatic module of claim 1, wherein the yokes are of single piece construction.

3. The hydrostatic module of claim 1, wherein the yokes contain integrated fluid passages.

4. A bent axis hydrostatic module, comprising:

a frame;

a pair of parallel laterally spaced shafts rotatably supported by the frame and directed outwardly from the frame in the same direction;

two yokes pivotally mounted about parallel axes on the frame, wherein the yokes are of single piece construction and contain integrated fluid passages;

a hydrostatic power unit swingably carried by each yoke, and each hydrostatic power unit being operatively connected to one of the shafts to rotate the same;

a pair of system pressure conduits in the frame with each of the pressure conduits being fluidly connected to each of the cylinder blocks; and a control system for pivoting the yokes including means for independently pivoting the yokes about parallel axes.

* * * * *